S. T. HOENER.
FRONT WHEEL DRIVE FOR VEHICLES.
APPLICATION FILED APR. 5, 1920.

1,394,013.

Patented Oct. 18, 1921.
4 SHEETS—SHEET 1.

S. T. Hoener
INVENTOR.

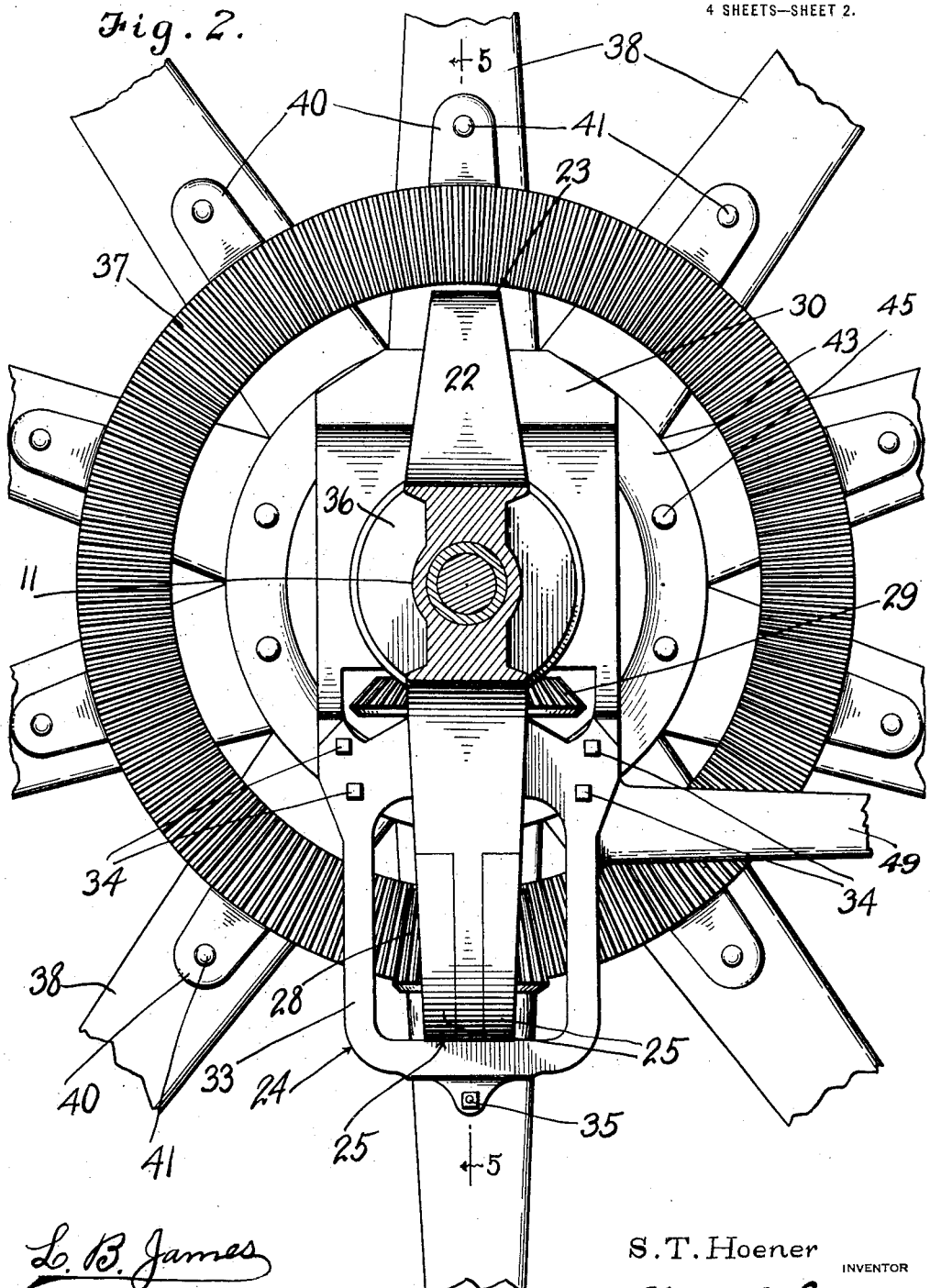

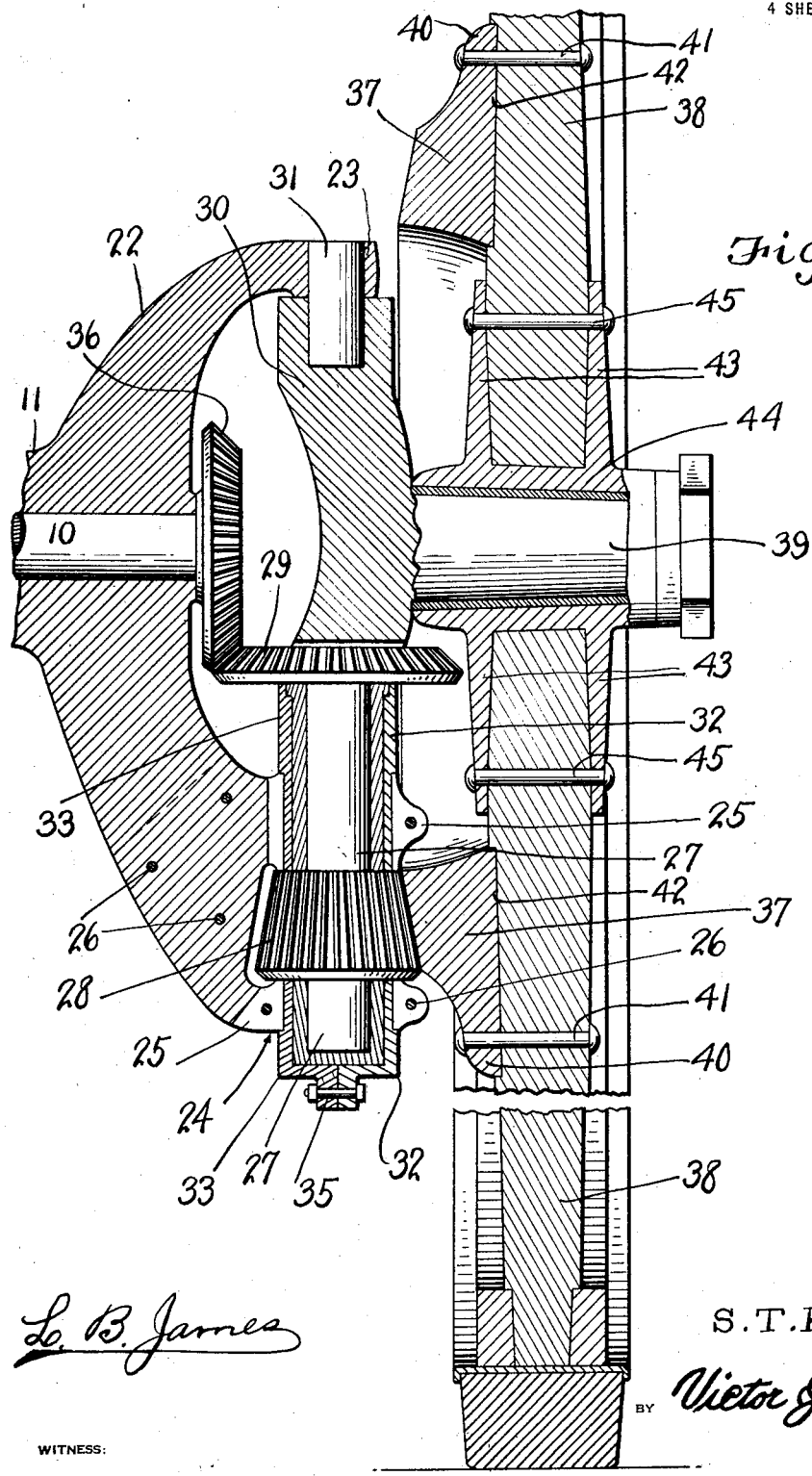

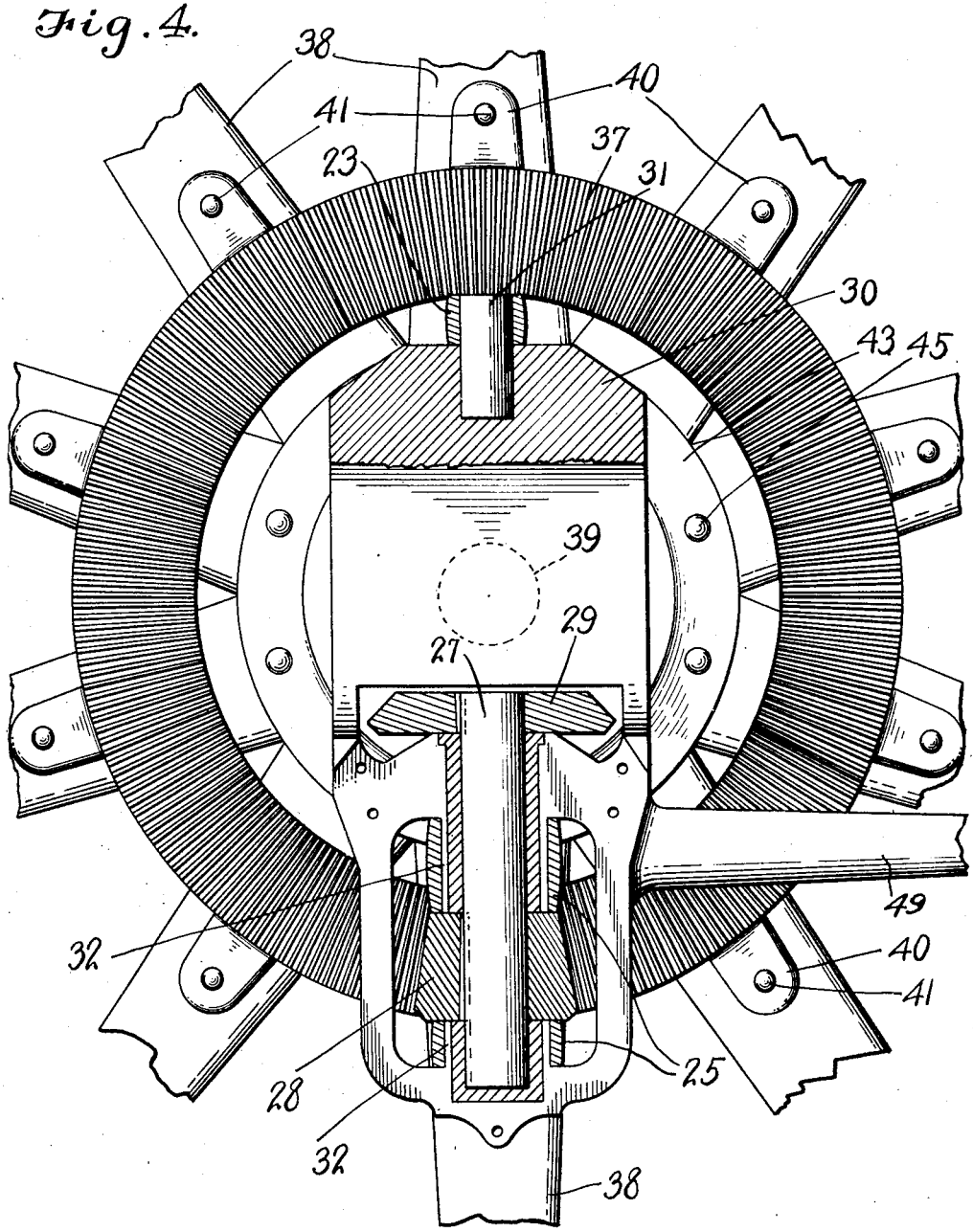

UNITED STATES PATENT OFFICE.

SAMUEL T. HOENER, OF SLATER, MISSOURI.

FRONT-WHEEL DRIVE FOR VEHICLES.

1,394,013.

Specification of Letters Patent.  Patented Oct. 18, 1921.

Application filed April 5, 1920. Serial No. 371,330.

*To all whom it may concern:*

Be it known that I, SAMUEL T. HOENER, a citizen of the United States, residing at Slater, in the county of Saline and State of Missouri, have invented new and useful Improvements in Front-Wheel Drives for Vehicles, of which the following is a specification.

The object of the invention is to provide a comparatively simple and effective four wheel drive suitable for use in connection with trucks, tractors, automobiles and other vehicles, and more especially to provide a means whereby driving or tractive motion may be communicated to the front or steering wheels of the vehicle under such conditions as to insure a proper transmission of their motive power thereto without detracting from the durability of the mechanism and without in any way interfering with the movement of the front wheels in the steering operation, and with these and related objects in view as will appear in the course of the following decription the invention consists in a construction, combination and relation of parts of which a preferred embodiment is illustrated in the accompanying drawing, wherein:

Fig. 2 is a side view of the same.

Fig. 3 is a vertical section on the plane indicated by the line 5—5 of Fig. 4.

Fig. 4 is a vertical section on the plane indicated by the line 6—6 of Fig. 3.

Figure 1:
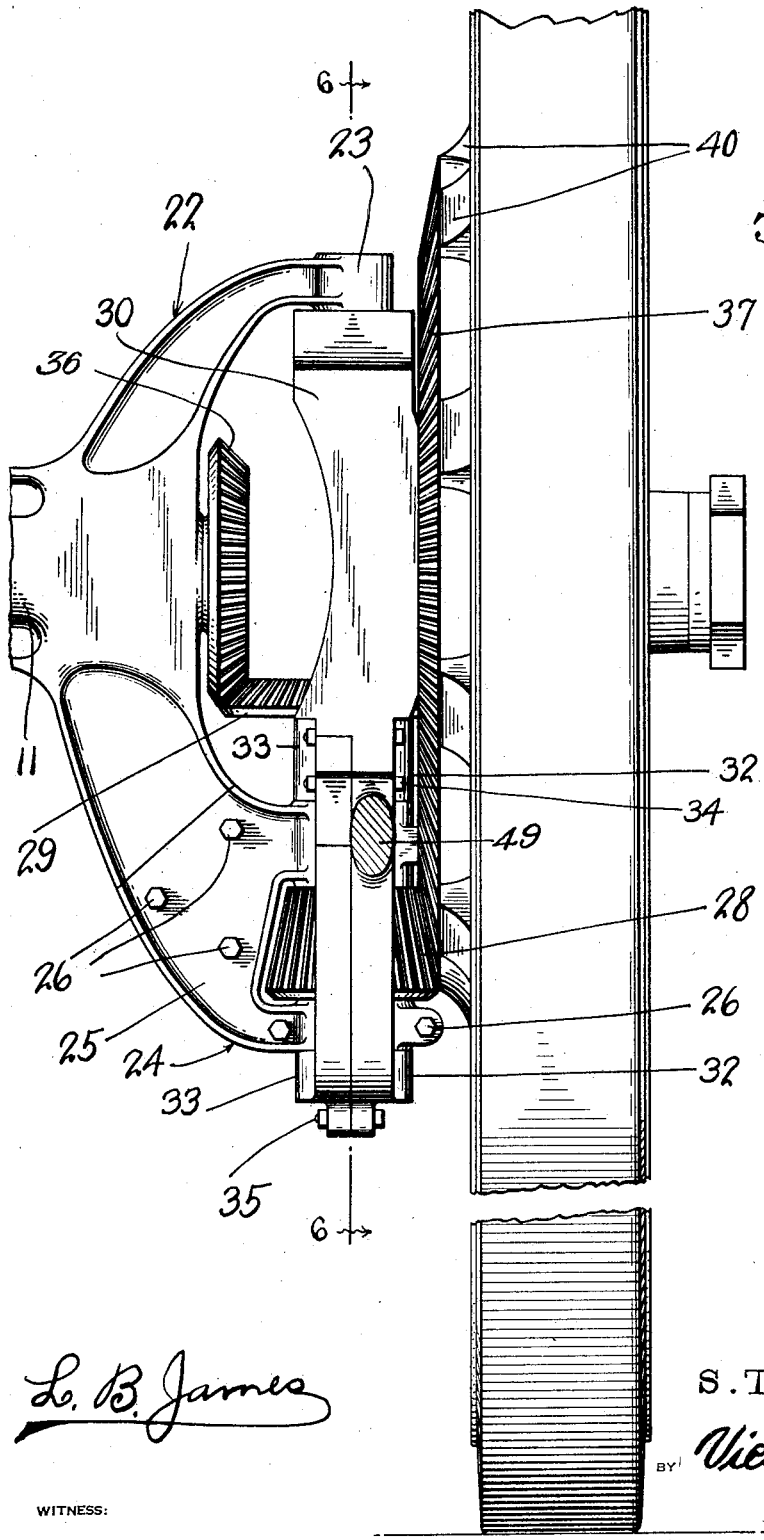
Figure 1 is a front view of the left front wheel and knuckle of the vehicle.

The front axle 11 is extended at each end to form a yoke 22 of which the upper and lower arms are provided respectively with bearing 23 and 24, the lower bearing being provided with a removable cap or bearing section 25 secured in place by transverse bolts 26 and adapted to be removed to permit of the mounting in said bearing of the spindle 27 which carries at one end the beveled pinion 28 and at the other end the gear 29. The knuckle block 30 is provided at its upper end with a bearing pin 31 mounted in the bearing 23 and at its lower end with a sleeve 32 having a removable cap 33 which is held in place by bolts 34 and is mounted upon the lower bearing member 24 of the yoke. It will be noted that the bearing sleeve 32 forming one of the bearing elements of the knuckle block engages the bearing member 24 of the axle yoke above and below the plane of the bevel pinion 28 and the lower end of the removable cap 33 of said bearing sleeve is secured by a bolt 35 located below the lower extremity of the spindle 27, so that said spindle is completely housed and protected.

To the end of the front axle shaft 10 is attached a beveled gear 36 which meshes with the gear 29 for communicating motion thereto and from the latter through the spindle 27 to the pinion 28 which in turn meshes with a gear ring 37 secured to the spokes 38 of the front wheel which is mounted upon the front wheel spindle 39 carried by the knuckle block 30. The gear ring is provided with radial ears 40 attached by bolts 41 to the several spindles and preferably provided with webs 42 seated in the spokes while the flanges 43 of the front wheel bearing box 44 are secured to the spokes as in the usual practice by the transverse rivets 45.

It will be understood that any desired form of anti-friction bearings may be provided for the axle shaft, the wheel spindle and the counter spindle 27 which carries the pinon 28 and gear 29, such as the Hyatt roller bearings or any equivalent thereof. A corresponding arrangement may be made with reference to the bearing pin 31.

It will be understood that the element of the gearing by which motion is communicated from the front axle shaft members to the front wheels is compactly arranged, in such relation to the other parts as not to be subject to contact with adjacent objects and not to interfere with the steering of the vehicle in the ordinary way as by means of the usual steering bar 49.

Conventional forms of the means for securing the bearing box upon the front axle spindle 39 and for mounting the tire are shown in the drawings and may be used in this connection and therefore require no detailed description.

What is claimed is:—

1. A front axle having a yoke provided with upper and lower bearings of which the latter is provided with a removable cap member and is extended to form a sleeve bearing, a knuckle block carrying a front wheel spindle and provided with an upper bearing pin mounted in the upper bearing of said yoke and a lower bearing sleeve mounted upon the extension of the lower sleeve bearing of said yoke, a gear ring carried by the wheel mounted upon said spindle, a counter spindle mounted within the lower yoke bearing and provided with a pinion meshing with said gear ring, a front axle shaft member and intermeshing gears carried by said shaft member and the upper end of the counter spindle.

2. A front axle having a yoke provided with upper and lower alined bearings of which the latter is extended to form a bearing sleeve and is provided with a laterally movable cap, a knuckle block having an upper bearing pin mounted in the upper yoke bearing and a lower bearing sleeve mounted exteriorly upon said first mentioned sleeve bearing and provided with a removable cap, said second mentioned bearing sleeve housing the lower end of the first mentioned bearing sleeve, a gear ring carried by the wheel mounted upon said spindle, a counter spindle mounted in the first mentioned sleeve bearing and carrying a pinion meshing with said gear ring, a front axle shaft member, and intermeshing gears carried respectively by said shaft member and the counter spindle.

In testimony whereof I affix my signature.

SAMUEL T. HOENER.